(12) United States Patent
Mitsuhashi (10) Patent No.: US 7,367,132 B2
(45) Date of Patent: May 6, 2008

(54) CONTACT-TYPE DISPLACEMENT MEASURING APPARATUS

(75) Inventor: Tadashi Mitsuhashi, Tokorozawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 0 days.

(21) Appl. No.: 11/377,569

(22) Filed: Mar. 17, 2006

(65) Prior Publication Data
US 2006/0225505 A1  Oct. 12, 2006

(30) Foreign Application Priority Data
Mar. 24, 2005  (JP) ............................. 2005-086062

(51) Int. Cl.
*G01B 3/00*  (2006.01)
*G01B 5/00*  (2006.01)
(52) U.S. Cl. .......................................... 33/556; 33/559
(58) Field of Classification Search .................. 33/556, 33/557, 559, 560, 561, 551, 555, 558, DIG. 13; 73/865.8, 865
See application file for complete search history.

(56) References Cited

U.S. PATENT DOCUMENTS

| | | | | |
|---|---|---|---|---|
| 2,219,282 | A | * | 10/1940 | Harder et al. .................. 33/558 |
| 5,012,684 | A | * | 5/1991 | Humphries ................. 73/865.8 |
| 5,040,308 | A | * | 8/1991 | Meyer .......................... 33/832 |
| 5,103,572 | A | * | 4/1992 | Ricklefs ...................... 33/558 |
| 5,321,895 | A | * | 6/1994 | Dubois-Dunilac et al. .... 33/556 |
| 5,724,745 | A | * | 3/1998 | Brenner et al. ................ 33/503 |
| 5,789,918 | A | * | 8/1998 | Imai et al. ............. 324/207.18 |
| 6,295,866 | B1 | * | 10/2001 | Yamamoto et al. ........... 73/105 |
| 6,307,084 | B1 | * | 10/2001 | Matsuki et al. ................ 558/58 |
| 6,314,800 | B1 | * | 11/2001 | Nishimura .................... 73/105 |
| 6,516,529 | B2 | * | 2/2003 | Hidaka et al. ................ 33/561 |
| 6,604,295 | B2 | * | 8/2003 | Nishimura et al. ........... 33/554 |
| 7,076,883 | B2 | * | 7/2006 | Yamamoto et al. ........... 33/556 |

FOREIGN PATENT DOCUMENTS

JP  06-147886 A  5/1994

OTHER PUBLICATIONS

Development of Non-Destructive Nano-metric Profiler by Kunitoshi Nishimura et al New Energy and Industrial Technology Development Organization.

* cited by examiner

*Primary Examiner*—Yaritza Guadalupe-McCall
(74) *Attorney, Agent, or Firm*—Sughrue Mion, PLLC

(57) ABSTRACT

A contact-type displacement measuring apparatus includes a first movable body that reciprocates in a first linear direction; a driving unit that drives the first movable body; a second movable body that reciprocates in a second linear direction parallel to the first linear direction, in association with movement of the first movable body; a probe detachably arranged at a tip of the second movable body; a measuring force detecting unit that detects, at a rear end of the second movable body, a measuring force to an object when the probe is in contact with the object; a position detecting unit that detects, between the probe and the measuring force detecting unit, an amount of movement of the second movable body; and a control device that controls the amount of movement such that the measuring force is kept constant corresponding to an output of the measuring force detecting unit.

12 Claims, 10 Drawing Sheets

CONTACT-TYPE DISPLACEMENT MEASURING APPARATUS

BACKGROUND OF THE INVENTION

1. Field of the Invention

The present invention relates to a contact-type displacement measuring apparatus.

2. Description of the Related Art

Conventionally, a contact-type displacement measuring apparatus is known (for example, "Development of a Nondestructive Surface Geometry Nano-Measuring Apparatus" by Kunitoshi Nishimura, et al., [online], New Energy and Industrial Technology Development Organization, [Retrieved on Jan. 30, 2004], the Internet <URL: http://www-w.nedo.go.jp/itd/teian/annmtg/fyll/seika/98y28001/98y28001s.html>) that is configured to have a measuring force detecting unit at the tip of a spindle, that detects contact with an object to be measured; a position detecting unit at the center of the spindle, that detects a displacement of the spindle; and a linear actuator at the rear end of the spindle, that moves the spindle in the direction of a shaft line. In a contact-type displacement measuring apparatus having such configuration, measurement of the object is executed by the position detecting unit through the measuring force detecting unit.

Figure 13:
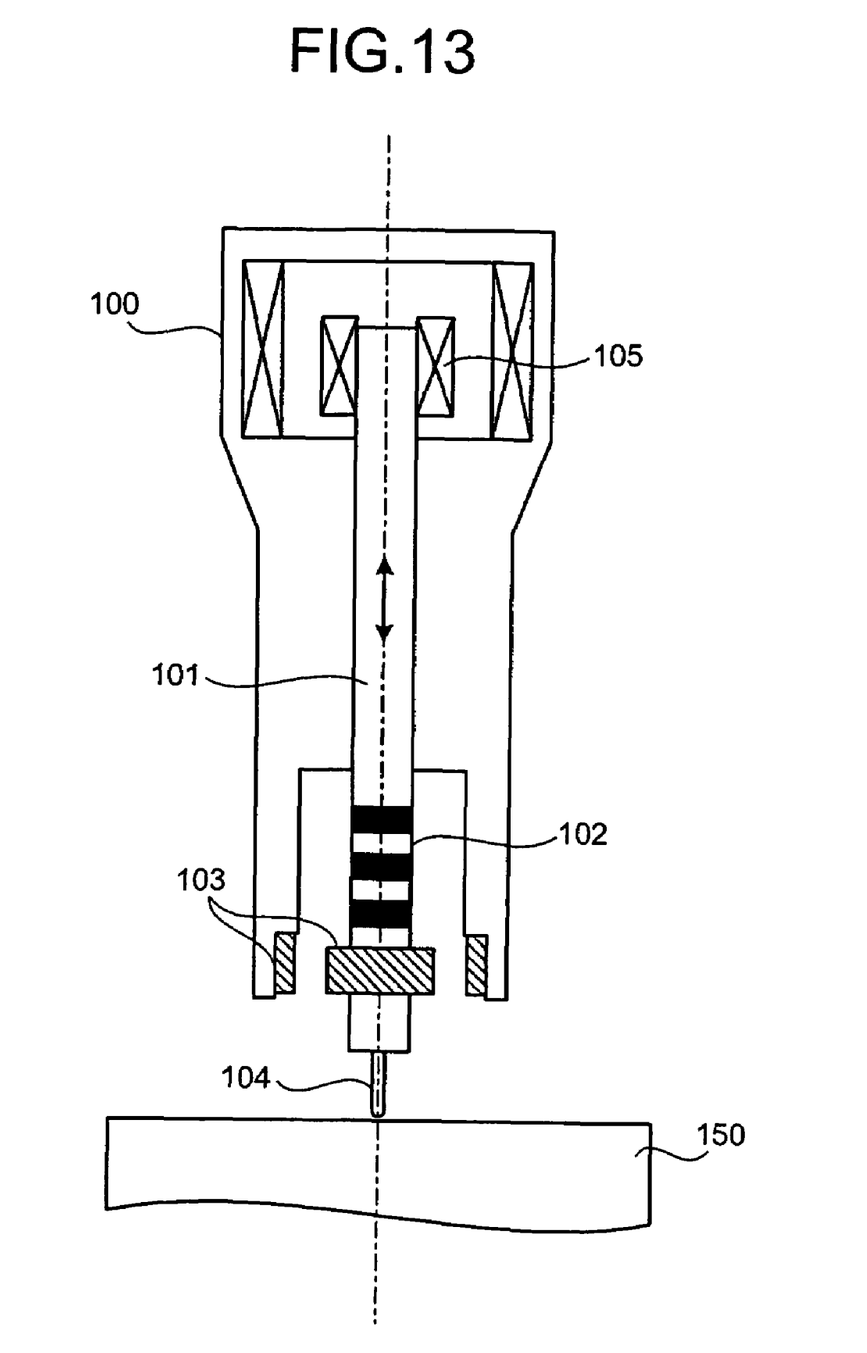
FIG. 13 is a schematic diagram of a configuration of a conventional contact-type displacement measuring apparatus.

FIG. 13 is a schematic diagram of a configuration of a contact-type displacement measuring apparatus disclosed in the above non-patent document "Development of a Nondestructive Surface Geometry Nano-Measuring Apparatus". As shown in FIG. 13, a spindle 101 that moves vertically is provided in substantially the center of a frame 100. At the tip of the spindle 101, an electric-capacitance-type displacement detector 103 and a stylus 104 are mounted through a piezoelectric element 102 that generates a micro displacement. The stylus 104 is constituted of an oscillator that resonates in the primary mode with a support point as a node of vibration and both ends as antinodes. When the tip of a horn of the oscillator in a resonant state is caused to contact an object 150 to be measured and the oscillator is constrained, the resonant state of the stylus 104 changes.

The change of the resonant state is detected by a detecting electrode. Thereby, it is detected that the tip of the stylus 104 has contacted the object 150 to be measured. At the rear end of the spindle 101, a moving-coil-type actuator 105 that generates a rough displacement is disposed. According to a fine-and-rough driving scheme by this moving-coil-type actuator 105 and the piezoelectric element 102, micro displacements are measured by the piezoelectric element 102 and large displacements are measured by the moving-coil-type actuator 105 when the tip of the stylus 104 is caused to follow the shape of the object to be measured.

As an amount to be measured in a direction of Z-axis (direction perpendicular to the plane that the tip of the stylus 104 contacts) of the shape of the object, a value detected by the electric-capacitance-type displacement detector 103 is used. A surface geometry measuring apparatus is known (for example, Japanese Patent Application Laid-Open Publication No. H6-147886) that is configured to have parallel springs on a bottom face of a movable body capable of micro moves; and, on one end of the parallel springs, a contact finger that contacts a surface to be measured; a movable body displacement detecting unit that detects the amount of a displacement of the movable body; and an resilient body displacement detecting unit that detects the amount of a displacement of the parallel springs.

However, in the contact-type displacement measuring apparatus disclosed in the above non-patent document, when the tip of the stylus contacts the object to be measured and the oscillation mode of the oscillator changes, distortion is generated in the measuring force detecting unit and the dimensions of the measuring force detecting unit itself change. Therefore, an error is generated when the object is measured and such a problem arises that correct measurement results and reproducible measurement results can not be obtained. Because the portion that contact the object is constituted of a stylus, another problem arises that measurement can not be executed using a probe, mounted on the tip of the spindle, that is used in a common contact-type displacement measuring apparatus and that fits the shape of the object.

In the surface geometry measuring apparatus disclosed in Japanese Patent Application Laid-Open Publication No. H6-147886, when the contact finger moves upward and downward following the surface geometry of the surface to be measured, the parallel springs are deformed in response to the movement. Therefore, the lateral position of the contact finger mounted on the tip of the parallel springs is shifted to the base end side of the parallel springs. Therefore, such a problem arises that an error is generated in the measurement result.

SUMMARY OF THE INVENTION

It is an object of the present invention to at least solve the above problems.

A contact-type displacement measuring apparatus according to one aspect of the present invention includes a first movable body configured to move in reciprocation in a first linear direction; a driving unit configured to drive the first movable body; a second movable body configured to move in reciprocation in a second linear direction that is different from the first linear direction, in association with movement of the first movable body; a probe arranged at a tip of the second movable body; a measuring force detecting unit configured to detect, at a rear end of the second movable body, a measuring force applied to an object in a state in which the probe is in contact with the object; a position detecting unit configured to detect, between the probe and the measuring force detecting unit, an amount of movement of the second movable body; and a control device configured to control the amount of movement of the first movable body such that the measuring force is kept constant corresponding to an output of the measuring force detecting unit.

A contact-type displacement measuring apparatus according to another aspect of the present invention includes a movable body configured to move in reciprocation in a linear direction; a driving unit configured to drive the movable body; a probe arranged at a tip of the movable body; a measuring force detecting unit configured to detect a measuring force applied to an object in a state in which the probe is in contact with the object; a position detecting unit configured to detect an amount of movement of the movable body; and a control device configured to control the amount of movement of the movable body such that the measuring force is kept constant corresponding to an output of the measuring force detecting unit.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of a contact-type displacement measuring apparatus according to the present invention will be explained in detail below with reference to the accompanying drawings. Like reference characters represent like components in the following explanation of the embodiments and the accompanying drawings and same explanation will be omitted.

Figure 1:
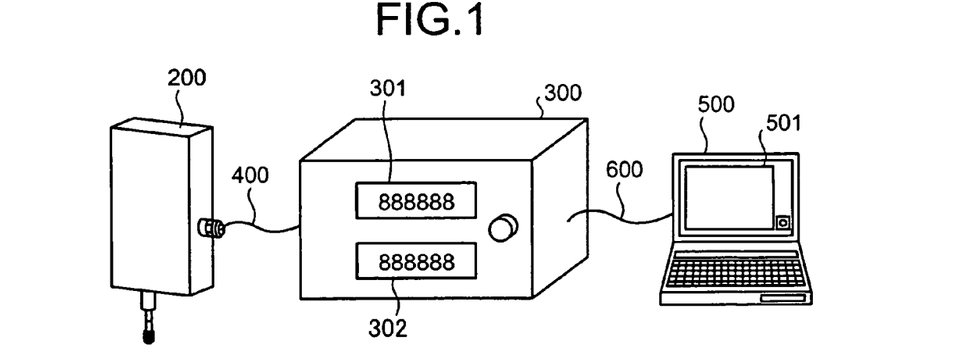
FIG. 1 is a schematic diagram of a configuration of a contact-type displacement measuring apparatus according to embodiments of the present invention.

FIG. 1 is a schematic diagram of a configuration of a contact-type displacement measuring apparatus according to an embodiment of the present invention. As shown in FIG. 1, the contact-type displacement measuring apparatus according to the embodiment includes a detector 200 that is caused to contact an object (not shown) to be measured, a control device 300 that controls the detector 200. The detector 200 and the control device 300 are connected to each other through a cable 400. The control device 300 is connected to a computer 500 through a cable 600. The computer 500 displays and records measurement results obtained by the detector 200.

Figure 2:
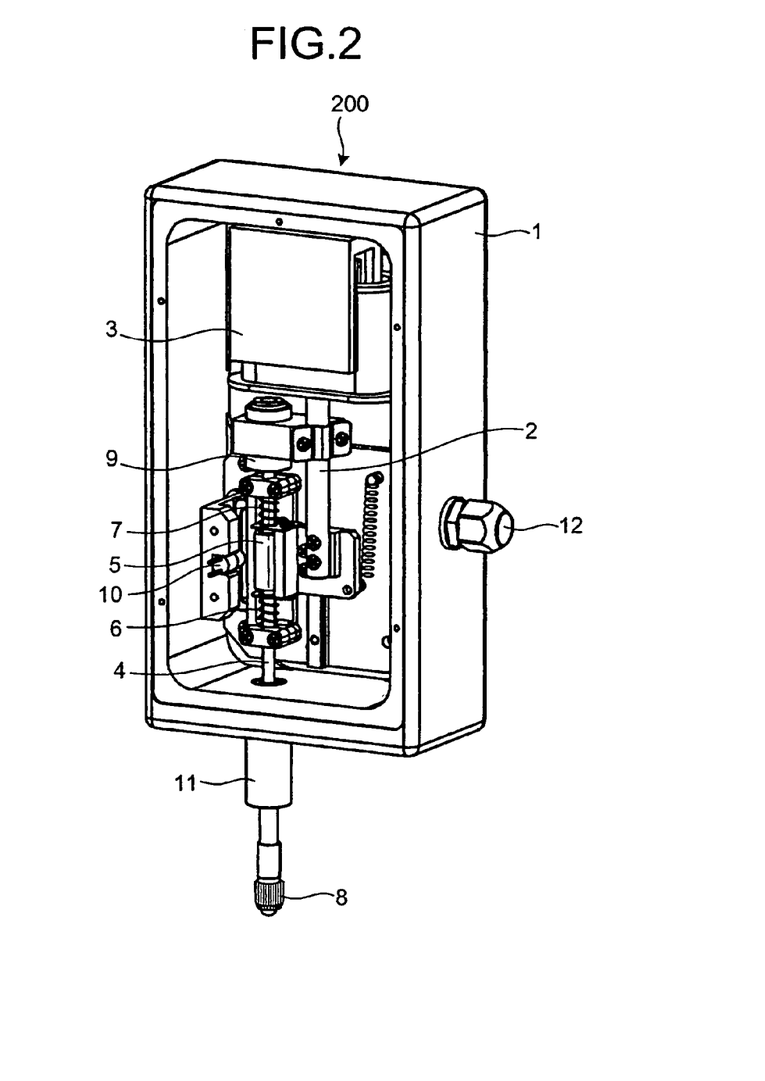
FIG. 2 is a perspective view of an essential part of an example of a detector.

The configuration of the detector 200 will be described. The control device 300 will be described later. FIG. 2 is a perspective view of an essential part of an example of the detector 200. As shown in FIG. 2, a first movable body 2 capable of reciprocation in a first linear direction, a driving unit 3 that drives the first movable body 2, and a second movable body 4 are accommodated in a frame 1. The second movable body 4 is supported by a supporting unit 5 fixed to the first movable body 2, and pressed coil springs 6, 7 provided at both ends of the supporting unit 5 such that the second movable body 4 is capable of reciprocation in a second linear direction.

The second movable body 4 moves in association with the movement of the first movable body 2 through the supporting unit 5 and the pressed coil springs 6, 7. The first linear direction and the second linear direction do not coincide with each other, however, are parallel to each other. The tip of the second movable body 4 is mounted detachably with a probe 8. The probe 8 is replaced with a preferable probe in response to the shape, etc., of the object not shown.

A measuring force detecting unit 9 that detects a measuring force applied to the object when the probe 8 is in contact with the object, and a position detecting unit 10 that detects the amount of movement of the second movable body 4 are also accommodated in the frame 1. The measuring force detecting unit 9 detects a measuring force at the rear end of the second movable body 4. The position detecting unit 10 detects the amount of movement of the second movable body 4 between the probe 8 and the measuring force detecting unit 9, that is, at a position closer to the probe 8 than the measuring force detecting unit 9. The tip of the second movable body 4 is protruded out of the frame 1 through the interior of a stem 11 provided to the frame 1.

The opening of the frame 1 is closed by a lid not shown. In this contact-type displacement measuring apparatus, the control device 300 (see, FIG. 1) described later controls the movement of the first movable body 2 caused by the driving unit 3 such that the measuring force detected by the measuring force detecting unit 9 is kept constant. Thereby, measurement of the object is executed with a constant force. The detector 200 is connected to the control device 300 through a cable not shown connected to a circuit board (see, FIG. 3) not shown in the frame 1 (see, FIG. 1). The cable is drawn out of the frame 1 through the cable outlet 12 provided to the frame 1.

Figure 3:
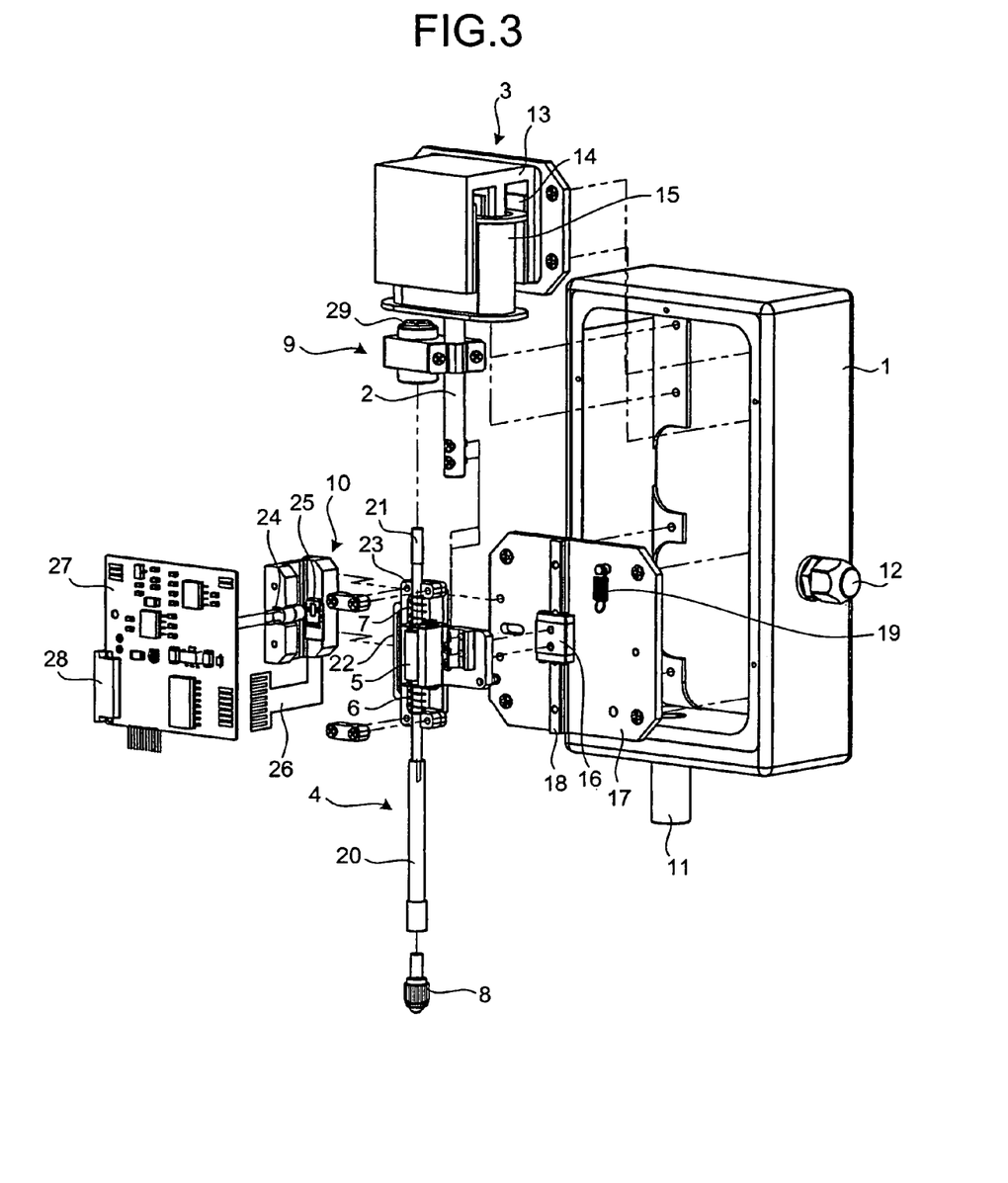
FIG. 3 is an exploded perspective view of the detector shown in FIG. 2.

FIG. 3 is an exploded perspective view of the detector 200 shown in FIG. 2. As shown in FIG. 3, the driving unit 3 is a kind of linear actuator, and is constituted of, for example, a voice-coil-type linear motor (VCM) constituted of an E-shaped yoke 13, a magnet 14, and a coil 15. The coil 15 is connected to the control device 300 through a cable not shown (see, FIG. 1). The coil 15 is fixed to one end of the first movable body 2 having a shape of, for example, a stick. The other end of the first movable body 2 is fixed to a linear guide 16 together with the supporting unit 5.

The linear guide 16 reciprocally moves in the first linear direction guided by a linear guide rail 18 provided to a linear guide mounting board 17. That is, the first movable body 2 reciprocally moves in the first linear direction guided by the linear guide 16 and the guide rail 18 in response to the driving force of the driving unit 3. In associated with the movement of the first movable body 2, the second movable 4 moves in the second linear direction within the range of measurement.

The linear guide mounting board 17 is fixed to the frame 1. The supporting unit 5 is suspended on the driving-unit 3 side by a tensile spring 19 attached at one end thereof to the linear guide mounting board 17. This is to suppress free moving of the second movable body 4 caused by the weight thereof when the driving unit 3 is not energized.

The second movable body 4 is constituted of a stick-like spindle 20 and a core 21 constituted of a magnetic material, provided at a rear end of the spindle 20. The spindle 20 is threaded through the pressed coil springs 6, 7, and the supporting unit 5, and is fixed at a scale holder 23 holding a scale 22. The supporting unit 5 is mounted to the scale holder 23 movably to the scale holder 23 with the resilient recovering forces of the pressed coil springs 6, 7. The supporting unit 5 is constituted of a ball slide such that the spindle 20 moves in response to the measuring force.

The linear guide mounting board 17 is mounted on a light-emitting element 24 such as a light emitting device (LED), etc., and a light-receiving integrated circuit (IC) 25 with a fixed scale pattern printed on a photodiode such that the light-emitting element 24 and the light-receiving IC 25 are facing each other sandwiching the scale 22. The position detecting unit 10 is an optical encoder constituted of the light-emitting element 24, the light-receiving IC 25, and the scale 22. Stripes formed by bright parts and dark parts, extending in a direction perpendicular to the second linear direction and arranged in turns in the second linear direction are formed on the scale 22.

When the scale 22 moves between the light-emitting element 24 and the light-receiving IC 25 associated with the movement of the spindle 20, light emitted from the light-emitting element 24 intermittently arrives at the light-receiving IC 25. The light-receiving IC 25 receives the intermittent arrival of the light, converts the intermittent arrival into a digital signal constituted of two values of bright (1) and dark (0), and outputs the digital signal. The amount of movement is detected by counting the number of pulses of this digital signal, and multiplying the number of counts by a predetermined amount of movement per count. The resolution of the position detecting unit 10, that is, the amount of movement of the spindle 20 per count is not especially limited, however, for example, 0.1 μm.

The light-receiving IC 25 is connected to a circuit board 27 through flexible printed circuit board (FPC) 26. The circuit board 27 is provided with a connector 28 that is connected to the flexible printed circuit board 26. The received light signal of the light-receiving IC 25 is sent to the circuit board 27 through the flexible printed circuit board 26, and sent to the control device 300 through a cable, not shown, connected to the circuit board 27 (see, FIG. 1).

The measuring force detecting unit 9 is constituted of a differential transducer constituted of a differential transducer main body 29 having two coils and the core 21 at the rear end of the spindle 20; and the pressed coil springs 6, 7. The differential transducer main body 29 is fixed to the first movable body 2 through a bracket and moves with the first movable body 2. The core 21 moves in the vicinity of the two coils of the differential transducer main body 29 caused by the movement of the spindle 20. The range within which the core 21 is movable against the differential transducer main body 29 is not especially limited, however, for example, approximately one millimeter (mm). The range within which the differential transducer main body 29 is movable, that is, the range within which the first movable body 2 is movable is larger than that the range within which the core 21 is movable.

When the core 21 moves in a magnetically excited state, that is, a state where an AC voltage is applied to the two coils of the differential transducer main body 29, the reactance of the two coils is varied and an output voltage corresponding to the amount of movement of the core 21 is obtained. The measuring force is detected based on this output voltage. An output signal of the measuring force detecting unit 9 is sent to the circuit board 27 through a cable not shown, and is sent to the control device 300 through a cable, not shown, connected to the circuit board 27 (see FIG. 1).

The position of the spindle 20 is determined by the total weight of the spindle 20, the probe 8, the core 21, the scale 22, and the scale holder 23; and the balance of the resilient recovering forces between the pressed coil springs 6, 7 sandwiching the supporting unit 5. This applies, for example, not only to the case where the detector takes the posture for the probe 8 to be caused to contact the object on the top thereof (hereinafter, "normal posture") but also to the cases where the detector takes the postures for the probe 8 to be caused to contact the object on the bottom thereof (hereinafter, "up-side-down posture"), on a side thereof (hereinafter, "lateral posture"), and obliquely on the bottom or the top (hereinafter, "oblique posture").

When measurement is executed in the normal posture, the first pressed coil spring 6 positioned on the probe 8 side supports the load of the spindle 20, etc. In the case of measurement in the up-side-down posture, the second pressed coil spring 7 positioned on the core 21 side supports the load of the spindle 20, etc. In the cases of measurement in the lateral posture and the oblique posture, the two coil springs 6, 7 are balanced with each other.

By selecting appropriately the spring constants and the initial amounts of the elastic deformation of the two pressed coil springs 6, 7 sandwiching the supporting unit 5, measurement of the object can be executed utilizing the range for which the relation between the amount of movement of the spindle 20 and the output value of the differential transducer has a high linearity. For example, FIG. 4 is a characteristic chart showing an output voltage value (amplified value) of the differential transducer and the amount of variation thereof plotted against the amount of movement of the spindle 20 when the spring constants and the initial amounts of the elastic deformation of the pressed coil springs 6, 7 are selected appropriately.

Figure 4:
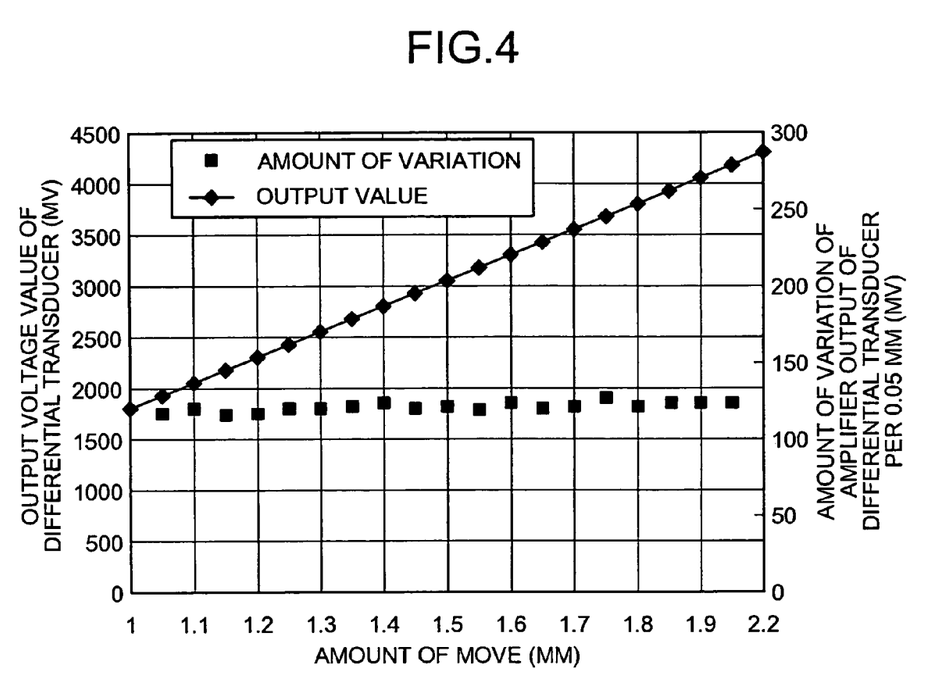
FIG. 4 is a characteristic chart showing an output characteristic of the measuring force detecting unit of the detector.

For the property as shown in FIG. 4, for example, the pressed coil springs 6, 7 may be selected such that the spindle 20 is positioned at a point 1.5 mm shifted from the original zero point of the differential transducer when the detector 200 is in the lateral posture. In this case, not especially limited, however, for example, when this length measuring apparatus is designed for the position of the spindle 20 to be displaced by approximately ±0.2 mm in response to the posture of the detector 200, the output voltage value (amplified value) of the differential transducer is varied by approximately ±500 millivolts (mV) However, in the example shown in FIG. 4, the range of this variation is included in the range for which the linearity is sufficiently high.

Figure 5:
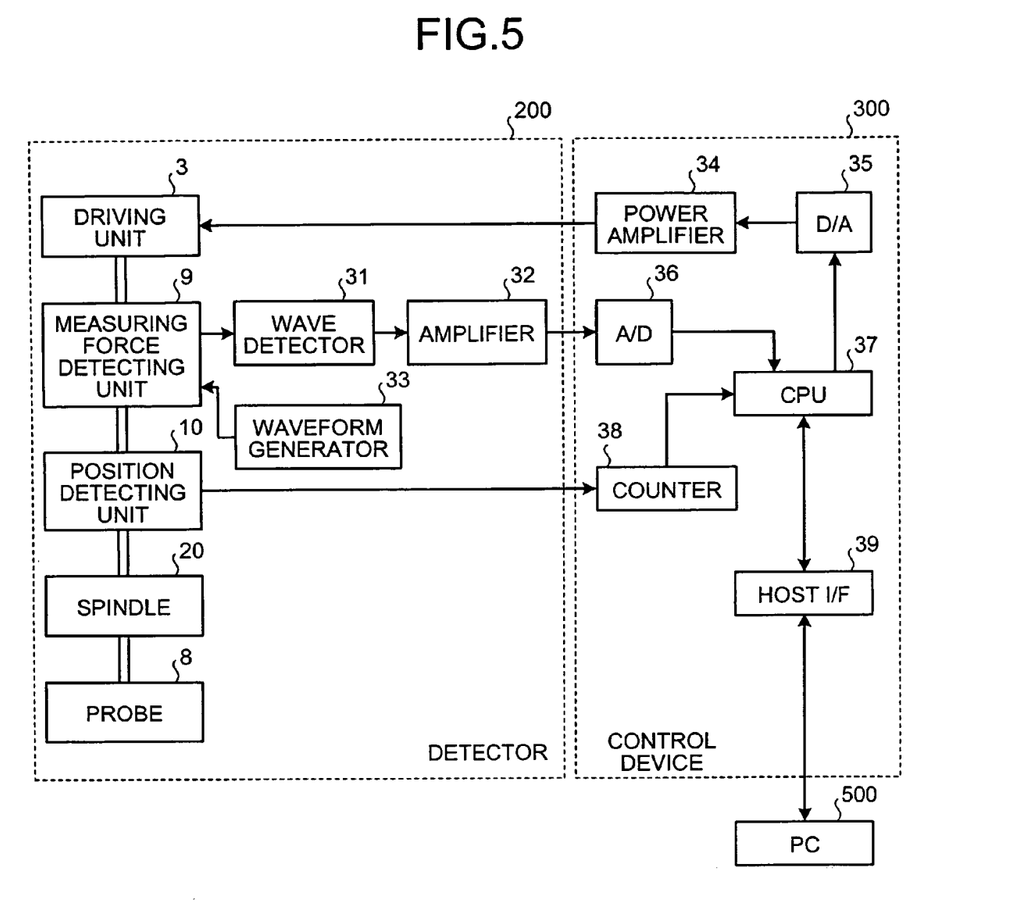
FIG. 5 is a block diagram of a configuration of the detector and a control device.

The control device 300 will be described. FIG. 5 is a block diagram of a configuration of the detector 200 and the control device 300. In FIG. 5, among the lines connecting blocks, double lines represent mechanical couplings, arrows represent electric couplings, and signals travel in the directions indicated by the arrows. In the detector 200, the configuration of mechanical couplings of the driving unit 3, the measuring force detecting unit 9, the position detecting unit 10, the spindle 20, and the probe 8 is as described above.

The circuit board 27 of the detector 200 is provided with a wave detector 31, an amplifier 32, and a waveform generator 33. The control device 300 is provided with a power amplifier 34, a digital/analog converter (D/A) 35, an analog/digital converter (A/D) 36, a central processing unit (CPU) 37, a counter 38, and a host interface (host I/F) 39.

The waveform generator 33 generates an AC signal and supplies the AC signal to the measuring force detecting unit 9. The coil of the measuring force detecting unit 9 is magnetically excited by this AC signal. The wave detector 31 detects a measuring force detecting signal caused to be outputted from the measuring force detecting unit 9 by being pushed of the spindle 20 when the probe 8 contacts the object. The amplifier 32 amplifies the output signal of the wave detector 31. The signal amplified by this amplifier 32 is the output voltage value (amplified value) of the differential transducer in the characteristic chart of the differential transducer shown in FIG. 4.

The signal amplified by the amplifier 32 is sent to the A/D converter 36 of the control device 300. The A/D converter 36 converts the analog signal received from the amplifier 32 into a digital signal, and provides the digital signal to the CPU 37. Based on the signal received from the A/D converter 36, the CPU 37 generates a controlling signal to control the position of the spindle 20 such that the measuring force takes a constant low level. The controlling signal is provided to the D/A converter 35.

The D/A converter 35 converts the controlling signal (a digital signal) provided from the CPU 37 into an analog signal. During this, an operator can set arbitrarily the digital/analog conversion amount (thinning amount) in the digital/analog conversion and, thereby, can regulate the moving speed of the spindle 20. The power amplifier 34 amplifies the analog signal converted by the D/A converter 35 to a signal having a level that can drive the driving unit 3 of the detector 200, and provides the amplified signal to the driving unit 3 of the detector 200. The driving unit 3 drives the member of the spindle 20, etc., based on the driving signal provided from the power amplifier 34.

A position detecting signal outputted from the position detecting unit 10 in response to the displacement of the spindle 20 is sent to the counter 38 of the control device 300. The counter 38 counts the number of pulses of the digital signal received from the position detecting unit 10. However, the value displayed on the counter 38 has been returned to the initial value thereof when measurement of the object is started.

The counter 38 provides a counted value to the CPU 37. The CPU 37 sends the measuring force detecting signal provided from the measuring force detecting unit 9 through the wave detector 31, the amplifier 32, and the A/D converter 36, and the position detecting signal provided from the position detecting unit 10 through the counter 38, to the host computer 500 through the host I/F 39 for serial communication such as RS232 and RS485, etc. The computer 500 displays measurement data that have been provided, on a screen 501 of the display (see, FIG. 1) and records the data in a recording apparatus such as a hard disk, etc. The computer 500 is adapted to be able to start or stop the operation of the detector 200.

Operation of the detector 200 and the control device 300 will be described referring to flowcharts shown in FIGS. 6 to 8. When an operator turns on the control device 300, the CPU 37 reads a measuring process program for the object from an integrated memory of the CPU 37, and starts a measuring process for the object. When the measuring process has been started, the CPU 37 converts the analog measuring force detecting signal outputted from the measuring force detecting unit 9 by passing the analog signal through the wave detector 31, the amplifier 32, and the A/D converter 36, into a digital signal and captures the digital signal (FIG. 6, step S1).

The measuring force is determined. That is, the CPU 37 compares a measuring force detecting value constituted of the measuring force detecting signal captured at step S1, with a predetermined value (hereinafter, "set value") in the integrated memory of the CPU 37, and determines whether or not an excessive load is applied on the probe 8 (FIG. 6, step S2). As a result, when the measuring force detecting value captured at step S1 is higher than the set value (step S2, "H"), the CPU 37 determines that an excessive load is applied on the probe 8 because some abnormal situation has occurred, and sends an error signal to the computer 500. The computer 500 displays an error message on the screen 501 of the display (see, FIG. 1) (FIG. 6, step S8).

Figure 6:
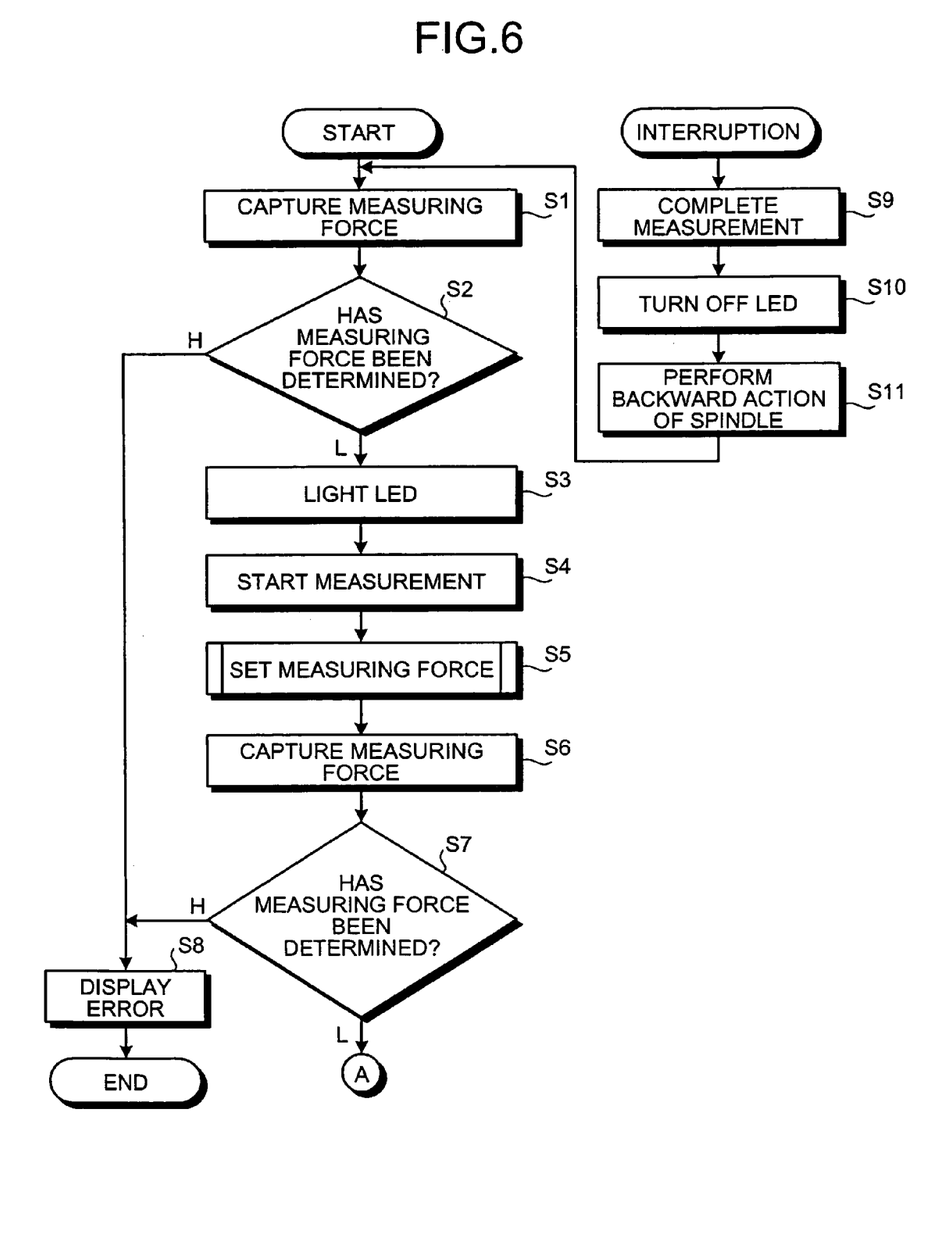
FIG. 6 is a flowchart of an operation of the detector and the control device.

When no excessive load is applied on the probe 8 as a result of the determination at step S2, that is, when the measuring force detecting value captured at step S1 is lower than the set value (step S2, "L"), the CPU 37 informs the operator that the detector 200 is in the stand-by state thereof (a state where the detector 200 can start measurement) (FIG. 6, step S3). As means for informing, for example, a light-emitting diode (omitted in FIG. 1 and FIG. 5) connected to an input/output port of the CPU 37 may be lighted, or a message or a symbol informing that the detector 200 is in the stand-by state thereof, may be displayed on the screen 501 (see, FIG. 1) of the display of the computer 500. Otherwise, the information may be informed using sound, etc., to the operator.

The operator confirms that the detector 200 is in the stand-by state, and instructs to start measurement by operating the computer 500 or operates a start switch (omitted in FIG. 1 and FIG. 5) of the control device 300 (FIG. 6, step S4). Thereby, the CPU 37 executes a sub-routine of a measuring force setting process shown in FIG. 8 (FIG. 6, step S5). In the sub-routine of the measuring force setting process, the CPU 37 captures the measuring force detecting value again from the measuring force detecting unit 9 and determines the value captured as a reference value (zero point) (FIG. 8, step S19). At this point, the CPU 37 returns the value displayed on the counter 38 to the initial value.

Figure 8:
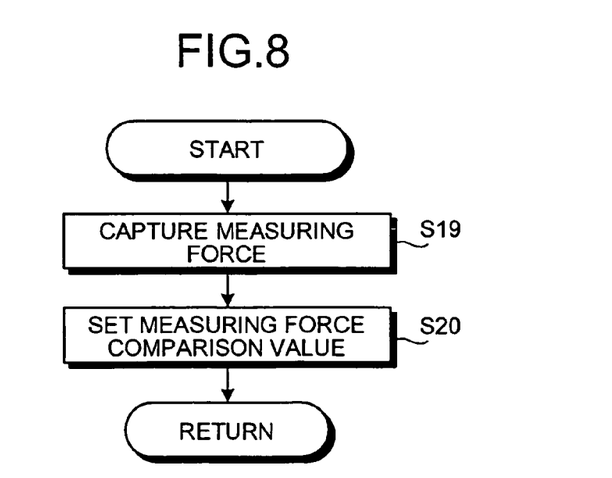
FIG. 8 is a flowchart of a subroutine of a measuring force setting process.

The CPU 37 adds a specific value to the reference value of the measuring force set at step S19 and determines this value as a measuring force comparison value (FIG. 8, step S20). The operator can arbitrarily determine the specific value to be added to the reference value. As described above, why the reference value of the measuring force is set and the measuring force comparison value is set using the reference value, is because the initial position of the spindle 20 differs in response to the posture (the normal posture, the up-side-sown posture, the lateral posture, or the oblique posture) of the detector 200, thereby, the measuring force differs and, therefore, a measuring force at the time when the spindle 20 is at the initial position thereof while the detector 200 is in a posture necessary for measurement is used as a reference. As described above, the control device 300 has a unit that corrects the measuring force varied in response to the posture of the detector 200 when the object is measured.

After the measuring force comparison value has been set, the CPU 37 captures the measuring force detecting value from the measuring force detecting unit 9 (FIG. 6, step S6). The CPU 37 again compares the measuring force detecting value captured at step S6 with the set value in the integrated memory of the CPU 37, and determines whether or not an excessive load is applied on the probe 8 (FIG. 6, step S7). When an excessive load is applied on the probe 8 as a result (step S7, "H"), the process is advanced to step S8 and the CPU 37 causes the screen 501 of the display (see, FIG. 1) of the computer 500 to display an error message.

When no excessive load is applied on the probe 8 as a result of the determination at step S7 (step S7, "L"), the CPU 37 causes the spindle 20 to move to the object side, that is, generates a controlling signal to execute a forward action. This controlling signal is converted into an analog signal by the D/A converter 35, is amplified by the power amplifier 34 to a signal having a level that can drive the driving unit 3 of the detector 200, and is provided to the driving unit 3. Thereby, the driving unit 3 is driven and the spindle 20 is moved to the probe side (FIG. 7, step S12).

Figure 7:
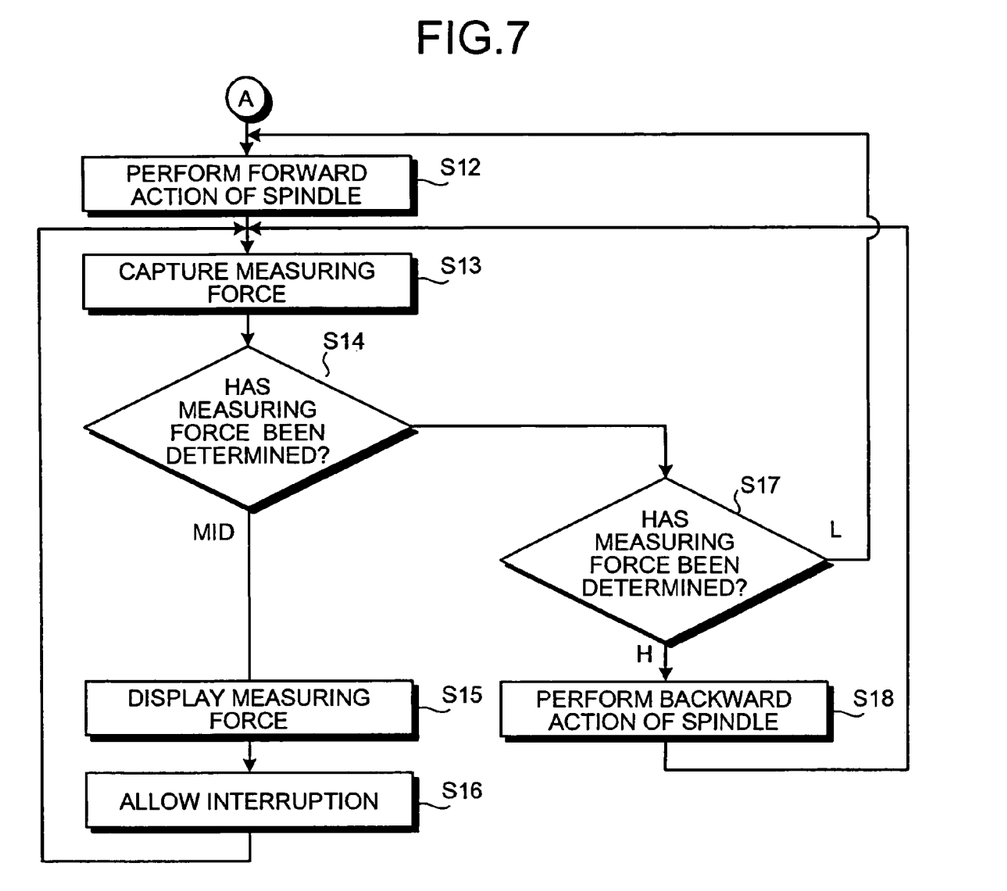
FIG. 7 is a flowchart of the operation of the detector and the control device following the operation shown in FIG. 6.

The CPU 37 captures the measuring force detecting value from the measuring force detecting unit 9 (FIG. 7, step S13). The CPU 37 determines whether or not the captured measuring force detecting value is in a range admissible to the set value of the integrated memory of the CPU 37 (FIG. 7, step S14). As a result of the determination, when the measuring force detecting value is not within the admissible range of the set value (non-"MID" case), whether the measuring force detecting value is larger than the maximum of the admissible range of the set value or is smaller than the minimum thereof is determined (FIG. 7, step S17).

As a result of the determination, when the measuring force detecting value is larger than the maximum of the admissible range of the set value (step S17: case of "H"), the CPU 37 causes the spindle 20 to move to the measuring force detecting unit 9 side, that is, generates a controlling signal to execute a backward action. This controlling signal is provided to the driving unit 3 of the detector 200 through the D/A converter 35 and the power amplifier 34. Thereby, the driving unit 3 is driven and the spindle 20 is moved to the measuring force detecting unit 9 side (FIG. 7, step S18). The process is advanced to step S13 at which the measuring force detecting value is captured, and the determination at step S14 is executed.

As a result of the determination at step 17, when the measuring force detecting value is smaller than the minimum of the admissible range of the set value (step S17: "L"), the process is advanced to step S12 at which the forward action of the spindle 20 is executed and the process is advanced to step S13. At step S13, the measuring force detecting value is captured, and the determination at step S14 is executed. As a result of the determination at step S14, when the measuring force detecting value is within the admissible range of the set value (case of "MID"), the CPU 37 determines that the measuring force has a proper magnitude, and displays the measuring force detecting value and the position detecting value at that time on display units 301, 302 (see, FIG. 1) of the control device 300 as well as sends those values to the computer 500. The computer 500 displays the measuring force detecting value and the position detecting value that have been sent, on the screen 501 of the display (see, FIG. 1) and records those values in a recording apparatus such as a hard disk (FIG. 7, step S15).

The CPU 37 allows an interruption (FIG. 7, step S16) and the process is returned to step S13. Until another interruption occurs, steps S12 to S18 are repeated and the measurement of the object is continued. While the measurement is continued, another interruption occurs when the operator instructs the completion of the measurement by operating the computer 500 or the operator operates an stop switch (no shown in FIG. 1 and FIG. 5) of the control device 300 (FIG. 6, step S9).

When, for example, a light-emitting diode has been lighted at step S3, the light-emitting diode is turned off (FIG. 6, step S10). Otherwise, a message or a symbol, etc., that informs the completion of the measurement may be caused to be displayed on the screen 501 of the display (see, FIG. 1) of the computer 500, or a sound may be made. The spindle 20 is returned to the original position thereof (FIG. 6, step S11) and the measurement is ended.

As described above, according to the embodiment, because the position detecting unit 10 is provided between the probe 8 and the measuring force detecting unit 9, the distortion of the measuring force detecting unit 9 is prevented from influencing on the position detecting unit 10. Therefore, measurement result containing no error caused by the distortion of the measuring force detecting unit 9 can be obtained. Because the measuring force is a constant and low value in the range of the movement of the spindle 20 and the load applied to the object to be measured is small, deformation of the object caused by the contact of the probe 8 can be suppressed. Therefore, a more accurate and reproducible measurement result can be obtained.

Because the supporting unit 5 is independent of the first movable body 2, variation of load caused by variation of friction generated by the linear guide 16, etc., associated with the movement of the first movable body 2, etc., can be prevented from influencing on the measuring force detecting unit 9. Therefore, a stable measuring force can be kept. Because the supporting unit 5 supporting the second movable body 4 is supported by the two pressed coil springs 6, 7, the total weight of the second movable body 4 and the probe 8 can be balanced. Therefore, a proper measuring force can be applied to the object.

Figure 9:
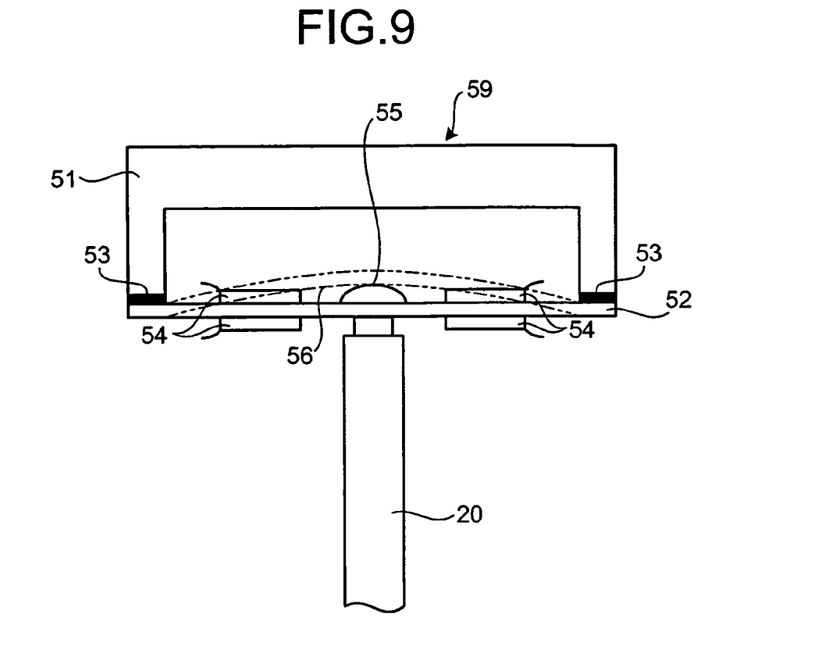
FIG. 9 is a front view of another example of the measuring force detecting unit.

In the above, the present invention is not only limited to the embodiment described above, however, various modifications can be made thereto. For example, as shown in FIG. 9, a measuring force detecting unit 59 may be used that is configured such that a supporting member 51 is fixed to the first movable body 2, not shown, through a bracket; a thin board 52 is fixed to the supporting member 51 with adhesive 53; strain gauges 54 are pasted on both sides of the thin board 52; and the rear end of the spindle 20 is fixed to the thin board 52 with a screw member 55. According to the measuring force detecting unit 59, when the spindle 20 is pushed up due to the contact of the probe 8 with the object, the thin board 52 is curved as indicated by a two-dot chain line 56 and a stress in the direction of the bending is generated to the strain gauge 54. Thereby, the measuring force can be detected.

Figure 10:
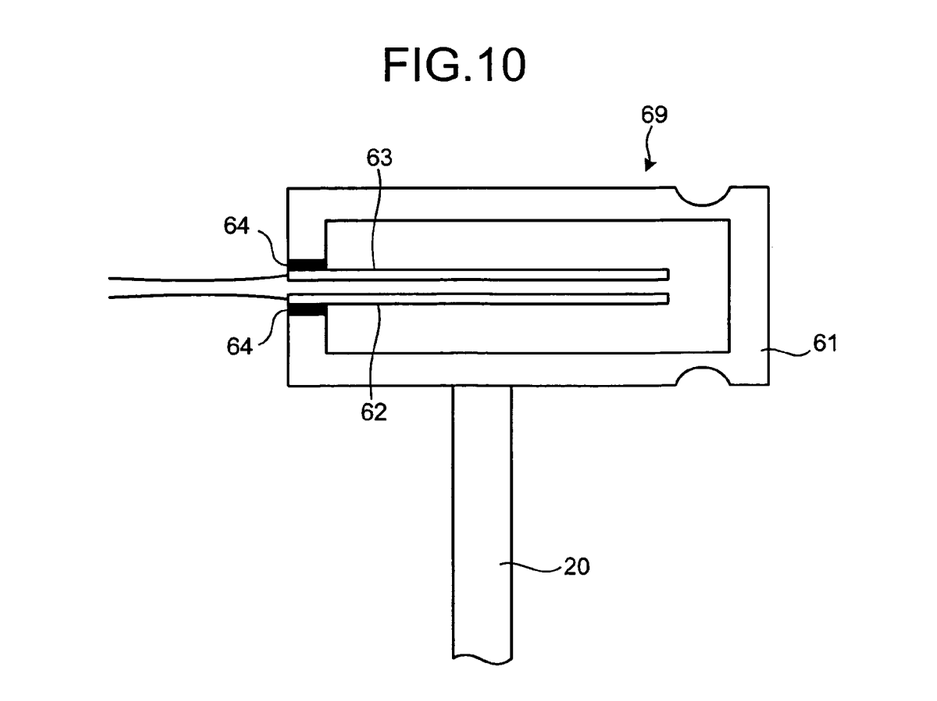
FIG. 10 is a front view of still another example of the measuring force detecting unit.

Otherwise, as shown in FIG. 10, a measuring force detecting unit 69 may be used that is configured such that a supporting member 61 is fixed to the first movable body 2, not shown, through a bracket; a pair of conductors 62, 63 are fixed to the supporting member 61 with adhesive 64 spaced from each other; and the spindle 20 can displace one 62 of the conductors. According to this measuring force detecting unit 69, when the spindle 20 is pushed up due to the contact of the probe 8 with the object, the length of the spacing between the pair of conductors 62, 63 is varied and the electrostatic capacity thereof is varied. Thereby, the measuring force can be detected.

Figure 11:
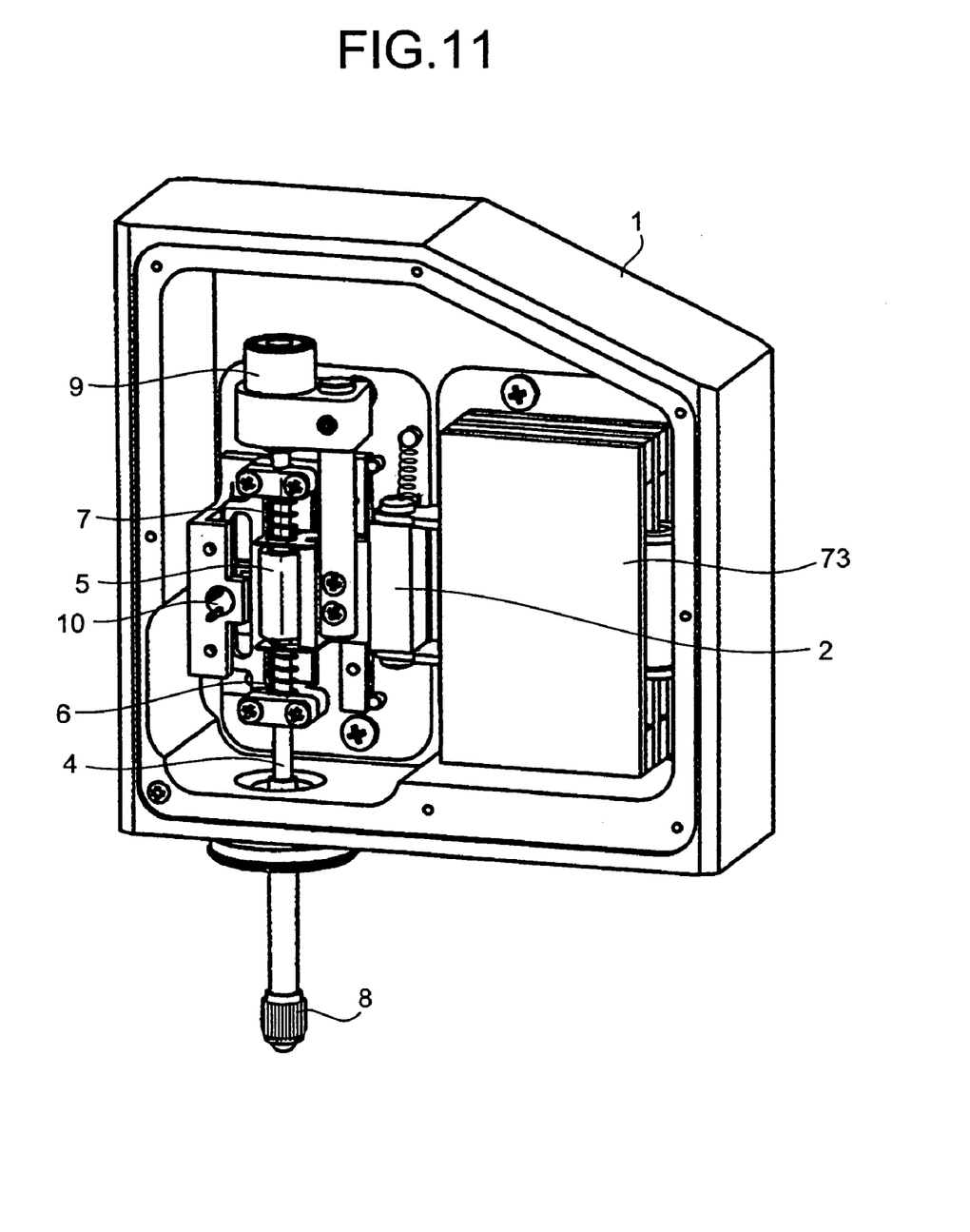
FIG. 11 is a perspective view of an essential part of another example of a detector.
Figure 12:
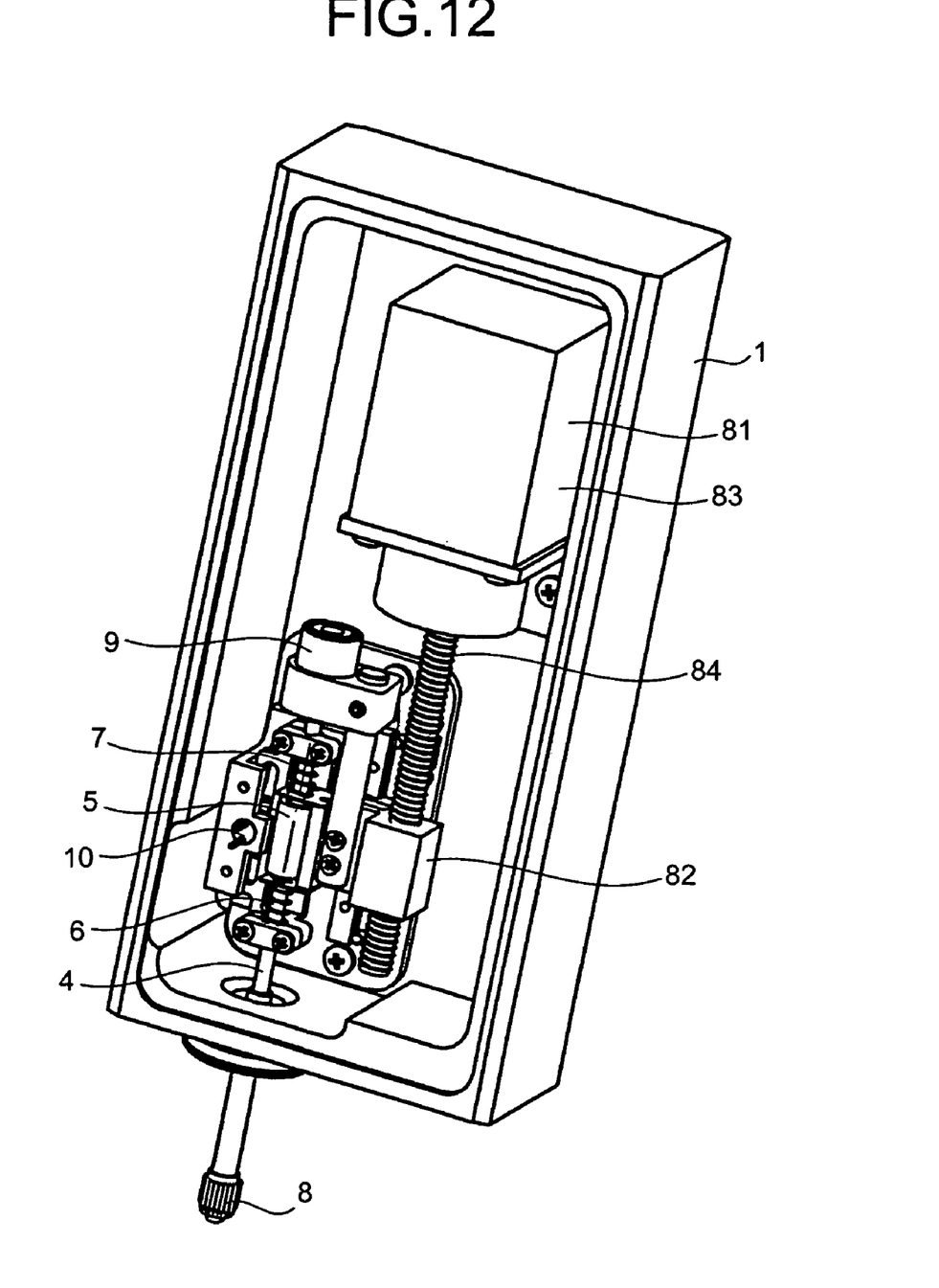
FIG. 12 is a perspective view of an essential part of a still another example of a detector.

As shown in FIG. 11, a driving unit 73 may be used that is constituted of a voice-coil-type linear motor including a yoke having a figure-eight shape. Otherwise, as shown in FIG. 12, a driving unit 83 may be used that is configured such that, by rotating a ball screw 84 by a stepping motor 81, a first movable body 82 screwed over the ball screw 84 is moved. The values such as the amounts of movement, the voltage values, etc., described in the description of the embodiment are examples and the present invention is not limited by those values.

According to the present invention, a correct and reproducible measurement result can be obtained.

The present document incorporates by reference the entire contents of Japanese priority document, 2005-086062 filed in Japan on Mar. 24, 2006.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A contact-type displacement measuring apparatus comprising:
   a first movable body configured to move in reciprocation in a first linear direction;
   a driving unit configured to drive the first movable body;
   a second movable body configured to move in reciprocation in a second linear direction that is spaced apart from the first linear direction, in association with movement of the first movable body;
   a probe arranged at a tip of the second movable body;
   a measuring force detecting unit configured to detect, at a rear end of the second movable body, a measuring force applied to an object in a state in which the probe is in contact with the object;

a position detecting unit configured to detect, at a position between the probe and the measuring force detecting unit, an amount of movement of the second movable body; and a control device configured to control the amount of movement of the first movable body such that the measuring force is kept constant corresponding to an output of the measuring force detecting unit.

2. The contact-type displacement measuring apparatus according to claim 1, wherein the second linear direction is substantially parallel to the first linear direction.

3. A contact-type displacement measuring apparatus comprising:

a first movable body configured to move in reciprocation in a first linear direction;

a driving unit configured to drive the first movable body;

a second movable body configured to move in reciprocation in a second linear direction that is spaced apart from the first linear direction, in association with movement of the first movable body;

a probe arranged at a tip of the second movable body;

a measuring force detecting unit configured to detect, at a rear end of the second movable body, a measuring force applied to an object in a state in which the probe is in contact with the object;

a position detecting unit configured to detect, at a position between the probe and the measuring force detecting unit, an amount of movement of the second movable body; and a control device configured to control the amount of movement of the first movable body such that the measuring force is kept constant corresponding to an output of the measuring force detecting unit, and further comprising, a supporting unit configured to movably support the second movable body, and to be integral with the first movable body, wherein the second movable body is supported by the supporting unit through a first coil spring configured to apply to the second movable body a force in one sense of the second linear direction and through a second coil spring configured to apply to the second movable body a force in another sense opposite to the one sense.

4. The contact-type displacement measuring apparatus according to claim 3, wherein the measuring force detecting unit includes a differential transducer including a main body configured to be fixed to the first movable body; and a core provided at a rear end of the second movable body, and configured to be moved in association with the movement of the second movable body, by a force generated by deformation of the first coil spring and the second coil spring, wherein the main body is configured to detect an amount of movement of the core, and the measuring force detecting unit is configured to detect the measuring force based on the amount of movement of the core.

5. The contact-type displacement measuring apparatus according to claim 3, wherein the measuring force detecting unit includes a thin board configured to be fixed to the first movable body and to a rear end of the second movable body; and a distortion gauge configured to be attached to the thin board, and to detect an amount of distortion of the thin board that is distorted by the movement of the second movable body when the second movable body is moved by a force generated by deformation of the first coil spring and the second coil spring, and the measuring force detecting unit is configured to detect the measuring force based on the amount of distortion of the thin board.

6. The contact-type displacement measuring apparatus according to claim 3, wherein the measuring force detecting unit includes a first conductor configured to be fixed to the first movable body; and a second conductor configured to be fixed to a rear end of the second movable body while being separated from the first conductor, and the measuring force detecting unit is configured to detect an amount of change of an electrostatic capacitance caused corresponding to fluctuation of a distance between the first conductor and the second conductor, the distance fluctuating according to movement of the second movable body when the second movable body is moved by a force generated by deformation of the first coil spring and the second coil spring, to detect the measuring force.

7. The contact-type displacement measuring apparatus according to claim 1, wherein the control device includes a correcting unit configured to correct the measuring force that fluctuates depending on a posture of the second movable body.

8. The contact-type displacement measuring apparatus according to claim 1, wherein the probe is detachably mounted on the second movable body.

9. A contact-type displacement measuring apparatus comprising:

a movable body configured to move in reciprocation in a linear direction;

a driving unit configured to drive the movable body;

a probe arranged at a tip of the movable body;

a measuring force detecting unit configured to detect a measuring force applied to an object in a state in which the probe is in contact with the object;

a position detecting unit positioned between the probe and the measuring force detecting unit and configured to detect an amount of movement of the movable body; and a control device configured to control the amount of movement of the movable body such that the measuring force is kept constant corresponding to an output of the measuring force detecting unit.

10. The contact-type displacement measuring apparatus according to claim 9, wherein the measuring force detecting unit is configured to detect the measuring force at a rear end of the movable body.

11. The contact-type displacement measuring apparatus according to claim 9, wherein the movable body includes a first movable body configured to move in reciprocation in a first linear direction; and a second movable body configured to move in reciprocation in a second linear direction that is spaced apart from the first linear direction, in associated with the movement of the first movable body.

12. The contact-type displacement measuring apparatus according to claim 11, wherein the second linear direction is substantially parallel to the first linear direction.

* * * * *